United States Patent [19]
Al-Shaikh et al.

[11] 3,947,668
[45] Mar. 30, 1976

[54] METHOD AND APPARATUS FOR CONTROLLING PULP REFINERS

[75] Inventors: Al Al-Shaikh, Sunnyvale; Erik B. Dahlin, Saratoga, both of Calif.

[73] Assignee: Measurex Corporation, Cupertino, Calif.

[22] Filed: July 20, 1973

[21] Appl. No.: 381,170

Related U.S. Application Data

[63] Continuation-in-part of Ser. No. 299,225, Oct. 20, 1972, abandoned.

[52] U.S. Cl. ........ 235/151.12; 162/252; 235/150.1; 241/28; 241/33
[51] Int. Cl.² .................. B02C 25/00; G06F 15/46
[58] Field of Search ......... 235/151.12, 151.1, 150.1; 241/28, 30, 37; 162/252, 253, 254, 258, 262, 263, 198, 261; 444/1

[56] References Cited
UNITED STATES PATENTS

| | | | |
|---|---|---|---|
| 2,699,095 | 1/1955 | Irwin | 241/37 X |
| 3,490,689 | 1/1970 | Hart et al. | 162/252 X |
| 3,568,939 | 3/1971 | Brewster et al. | 241/28 |
| 3,657,524 | 4/1972 | Bakke | 235/150.1 |
| 3,711,687 | 1/1973 | Stout et al. | 162/258 X |

*Primary Examiner*—Joseph F. Ruggiero
*Attorney, Agent, or Firm*—Flehr, Hohbach, Test, Albritton & Herbert

[57] ABSTRACT

Method and apparatus for controlling pulp refiners where a feed forward algorithm compensates for the time delay in the effective action of the base refiners which are coupled to a high frequency compensating tickler refiner by a machine chest which has a significant time lag. In addition, efficiency of the control system is enhanced by providing a simple control method for a complex series parallel matrix of base refiners where the change of specific energy is easily accomplished by a distribution algorithm.

6 Claims, 10 Drawing Figures

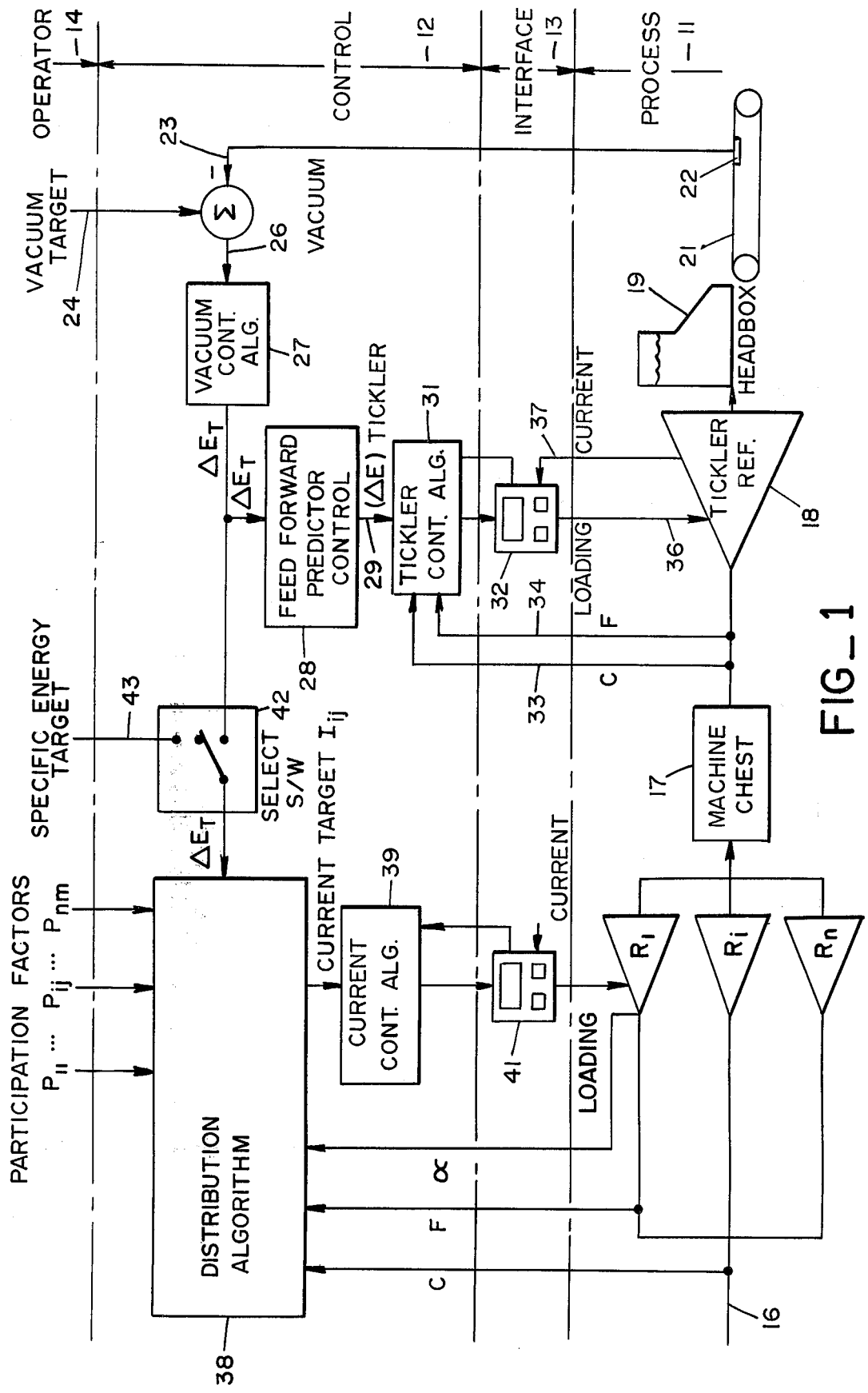
FIG_1

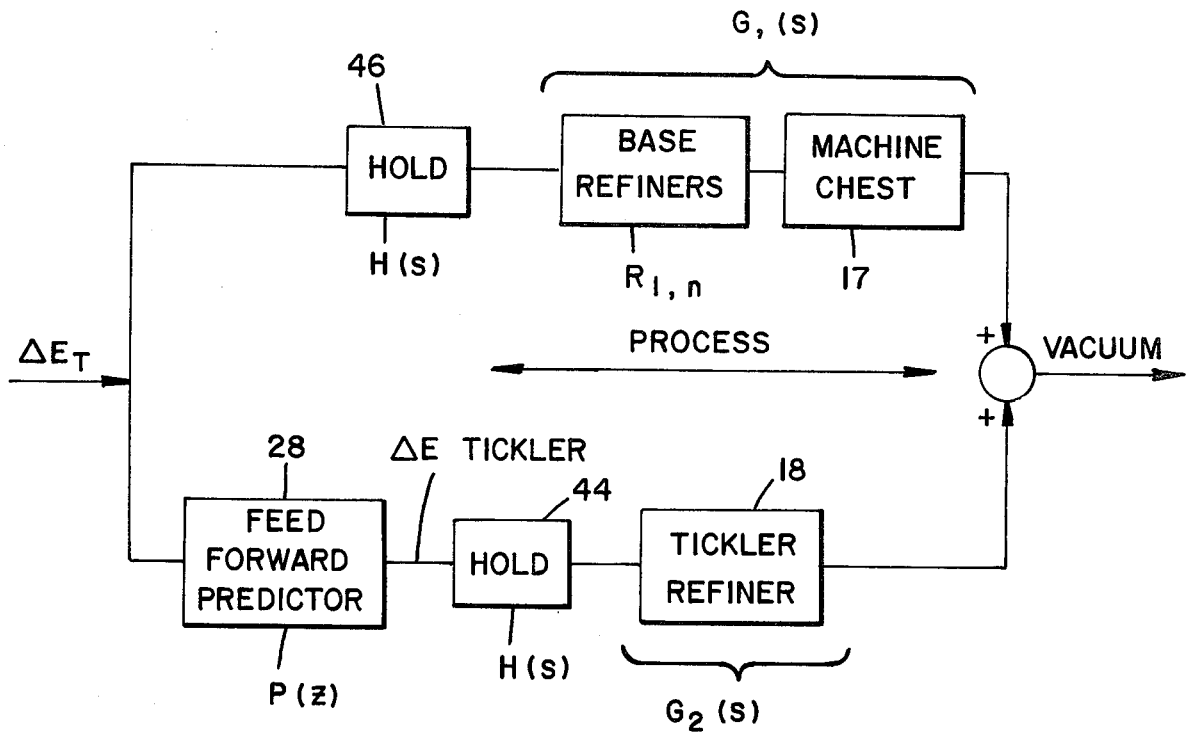
FIG_2
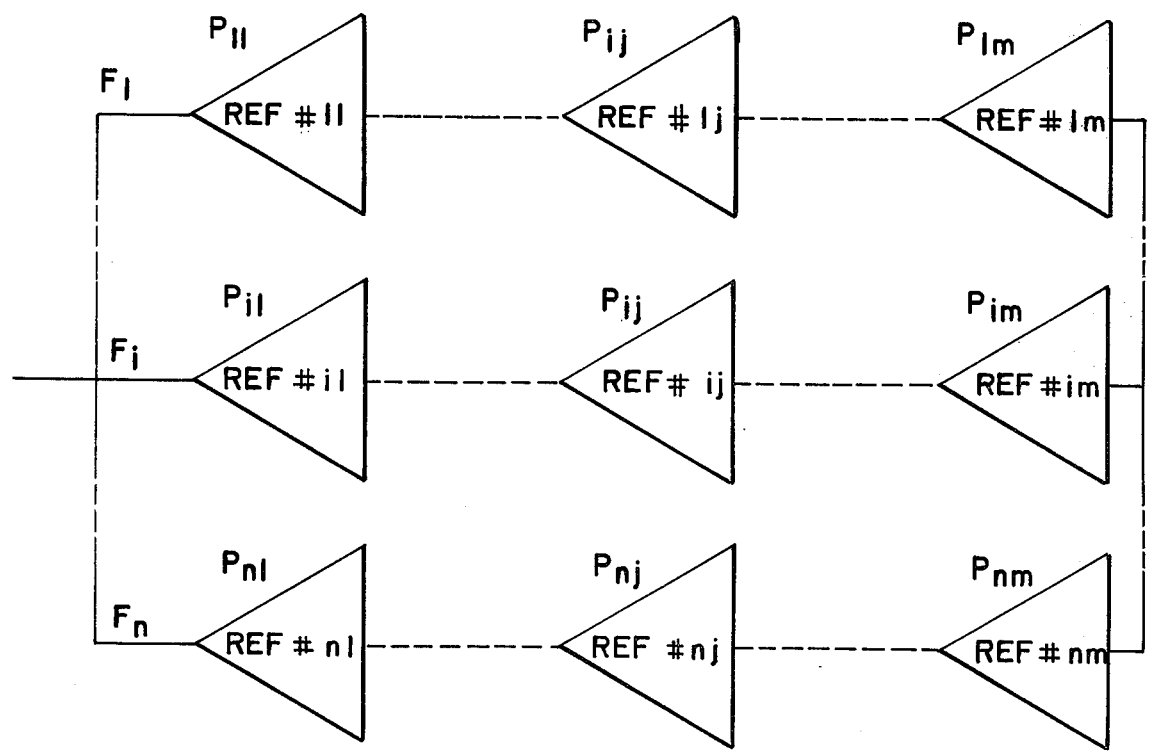
FIG_4

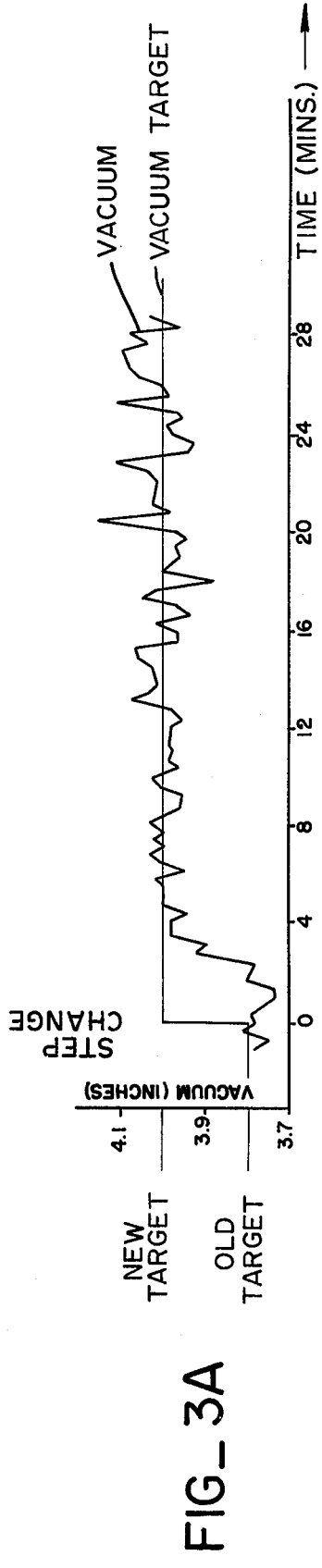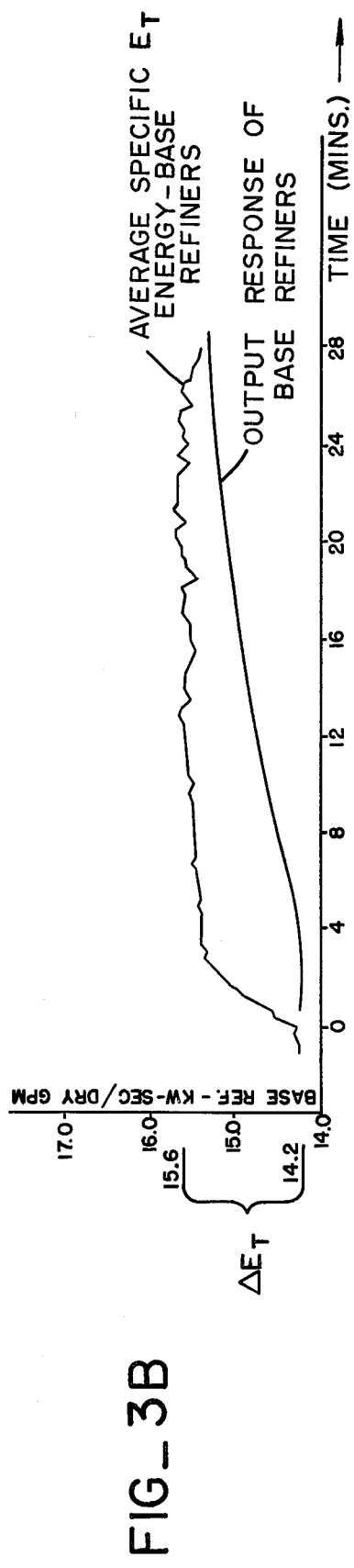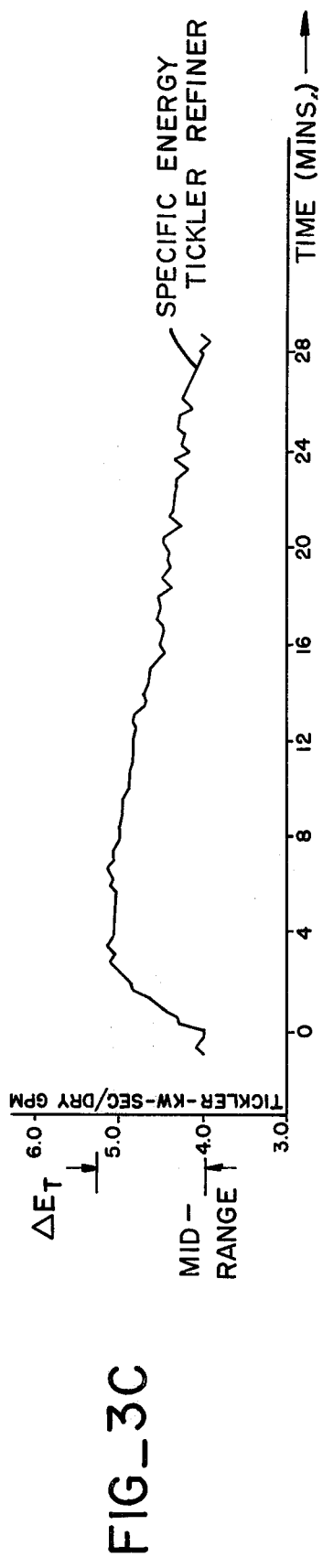
FIG_3A  FIG_3B  FIG_3C

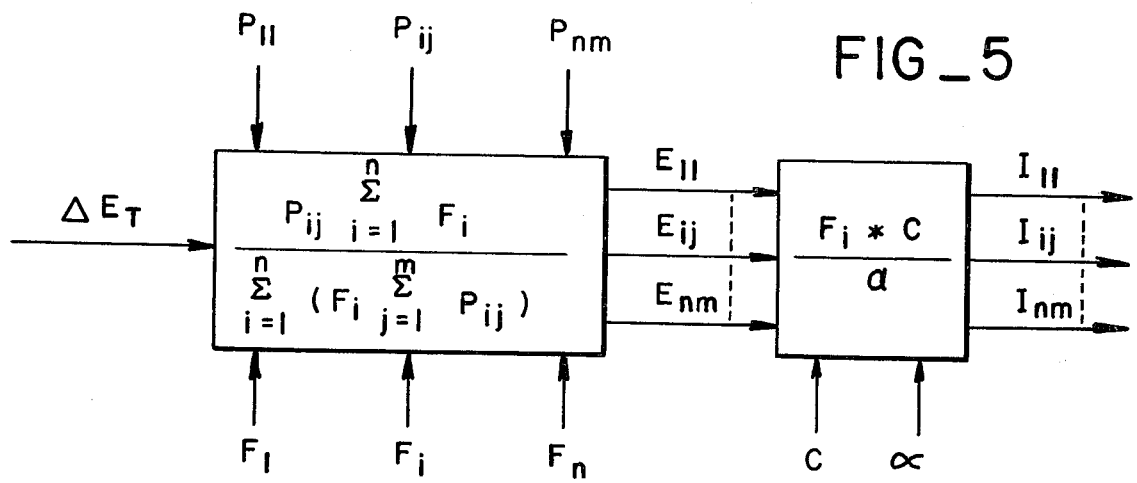
FIG_5
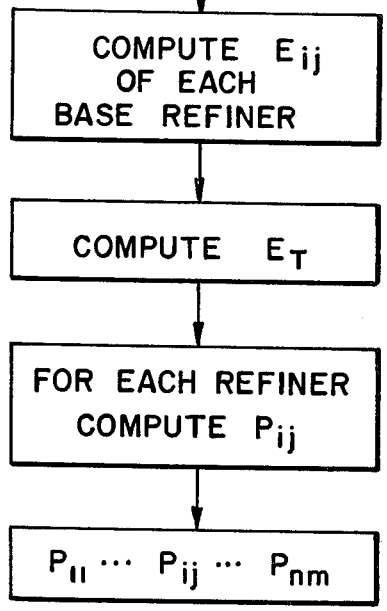
PERFORM INITIALLY
AND FOR ANY CHANGE IN P
$$E_{ij} = \frac{\alpha I_{ij}}{F_i C}$$
$$E_T = \frac{\sum_{i=1}^{n}(F_i \sum_{j=1}^{m} E_{ij})}{\sum_{i=1}^{n} F_i}$$
$$P_{ij} = P_T \frac{E_{ij}}{E_T}$$
FIG_6
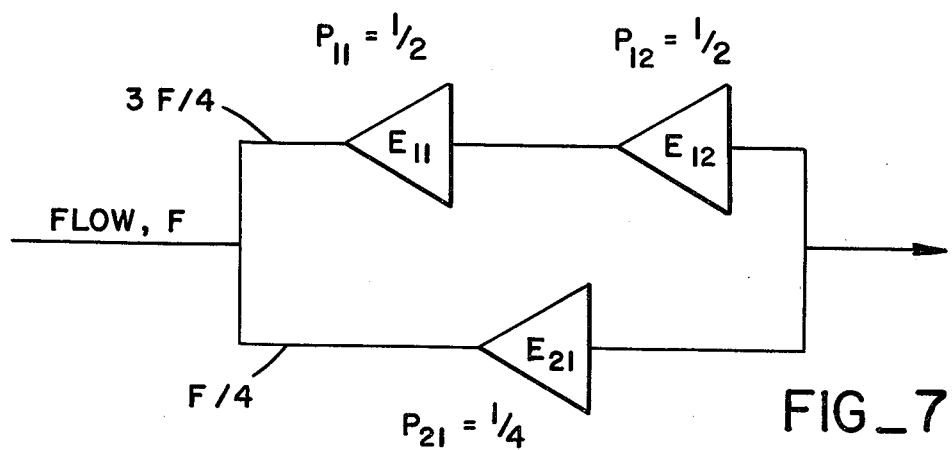
FIG_7

METHOD AND APPARATUS FOR CONTROLLING PULP REFINERS

CROSS-REFERENCE TO RELATED APPLICATION

This application is a continuation in part of copending application Ser. No. 299,225 filed Oct. 20, 1972 in the names of Al Al-Shaikh and Erik B. Dahlin.

BACKGROUND OF THE INVENTION

The present invention relates to a method and apparatus for controlling pulp refiners and more particularly to refiners used in manufacturing paper.

U.S. Pat. No. 3,568,939 in the name of Brewster et al discloses in detail the existing state of the art in controlling pulp refiners. In general, the major refining action is accomplished by a group of base refiners arranged in various series and parallel flow paths; a tickler refiner provides for fine or high frequency control of the quality of the output stock. One such quality in the case of paper is known as freeness.

An inherent problem in the control of refiners is the time delay between the base refiners and the output of the tickler refiner. such delay is caused in part by the time constants in the refining operations of all of the refiners. In addition, transport delay or lag is caused by a machine chest between the base refiners and tickler refiner which serves as a mixing tank for the output of the base refiners. Typical values are a time constant of five minutes and a transport lag of 3.5 minutes.

As discussed in the above Brewster patent, if there is a deviation of overall refining action from a set point, one would ideally desire that the maximum corrective action initially occur at the tickler refiner. Then, as the effect of subsequent control action at the base refiners is sensed, the loading of the tickler refiner is reduced back to 50% of capacity. In order to accomplish the foregoing, Brewster discloses an improved control system for adjusting the loading on the base refiners as a group.

However, the prior art does not disclose an integrated control system where both the tickler and base refiners are automatically controlled such that the output of the tickler refiner is closely maintained at the desired target with only minor variations. In addition, where the base refiners are arranged in a complex series-parallel matrix no simple control method has been provided. Such a method is, of course, very important where an overall integrated control scheme is desired.

OBJECTS AND SUMMARY OF THE INVENTION

It is, therefore, a general object of the invention to provide an improved method and apparatus for controlling pulp refiners.

It is another object to provide an integrated control system for both base and tickler refiners.

It is another object to provide a simple control method for a complex series-parallel matrix of base refiners.

In accordance with the above objects there is provided a control system for controlling a predetermined process variable the system having first and second manipulated variables upon which the process variable is dependent with disparate response times. The system includes first processing means for manipulating the first variable the processing means having relatively fast dynamic response for allowing high frequency control of said variable but being restricted in control range. Second processing means manipulate the second variable such processing means having a large control range relative to the first processing means but a much longer response time relative to the fast dynamic response. The first processing means is series coupled to the output of the second processing means. Means are provided for sensing the process variable at the output of the first processing means and comparing the sensed process variable to a target value to provide an error signal. Means responsive to the error signal cause the second processing means to manipulate the second variable to fully compensate for the error signal. Feedforward means responsive to the error signal cause the first processing means to change the first manipulated variable from an optimum operating value to a value which fully compensates for the error signal and thereafter which gradually changes the value back to the optimum value in accordance with the response time of the second processing means.

Feedforward means are responsive to said error signal for causing the first output control signal to change from an optimum operating value to initially load said tickler refiner means to fully compensate for the error signal and thereafter gradually change the loading back to the optimum value in accordance with the time delay.

In addition, there is provided a method of distributing the total energy requirement of a matrix of pulp refiners arranged in a plurality of parallel lines $i$ where $i = l,n$ each of the parallel lines having one or more refiners, $j$, in series where $j = l,m$. The method comprises initially determining the participation, $P_{ij}$, of each of said refiners. Thereafter at every control interval the specific energy, $E_{ij}$, required from a given refiner is determined in accordance with $$E_{ij} = \frac{P_{ij} \sum_{i=1}^{n} F_i}{\sum_{i=1}^{n} \left( F_i \sum_{j=1}^{m} P_{ij} \right)} * E_T$$

where $E_T$ is the average specific energy of all refining and $F_i$ is flow through a parallel path, $i$. Adjusting the loading on a given refiner in accordance with any change of $E_{ij}$ then occurs.

BRIEF DESCRIPTION OF THE DRAWINGS

FIG. 1 is a block diagram of a control system embodying the present invention;

FIG. 2 is a block diagram schematically illustrating the transfer functions of FIG. 1;

FIGS. 3A, 3B and 3C are characteristic curves illustrating the operation of FIG. 1;

FIG. 4 is a generalized block diagram of the base refiner portion of FIG. 1;

FIG. 5 is a block diagram representative of an algorithm performed in the system of FIG. 1;

FIG. 6 is a block diagram representative of another algorithm performed in the system of FIG. 1;

FIG. 7 is an example of a series parallel matrix of base refiners; and

DETAILED DESCRIPTION OF THE PREFERRED EMBODIMENT

Figure 8:
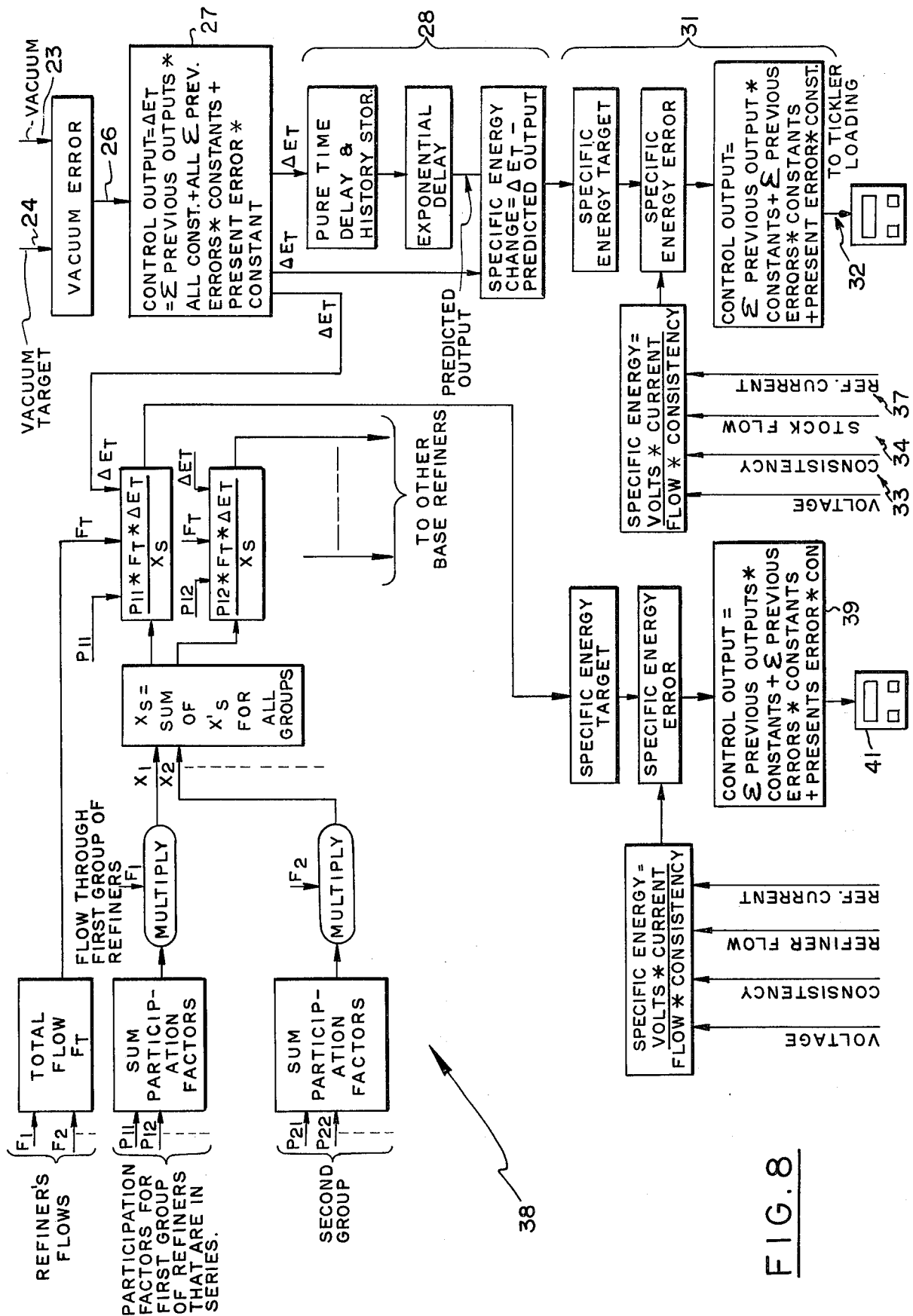
FIG. 8 is a flow chart based on FIG. 1.

Referring now to FIG. 1 there is illustrated the overall system of the present invention which is logically divided into four horizontal sections as illustrated in the drawings. These are the process section 11 where the actual processing of, for example, paper pulp is accomplished, a control section 12 which is interfaced with process section 11 by interface section 13 and an operator section 14. The process section 11 includes base refiners, $R_1$, $R_i$ and $R_n$ in parallel paths which receive incoming paper pulp on a flow line 16, refines the paper pulp, and thereafter supplies it to a common machine chest 17 where it is mixed together. The $n$ indicates any total number of parallel paths and $i$ represents any one path. Electrical energy is consumed in each refiner and is related to the per unit mass of fiber going through each refiner. This is termed specific energy and its units are kilowatt-seconds per dry gallons per minute. One measure of the specific energy of the refiner or its loading is the amount of current which is required by its driving electric motor. An equivalent measure is the temperature rise of pulp across a refiner.

A so-called tickler refiner 18 connected to the output of machine chest 17 provides for fine or high frequency control of the quality or freeness of the output stock. Although only one tickler refiner is shown two or more may be used in various series-parallel combinations. This output stock is in normal course coupled to a headbox 19 which feeds in a manner known in the art a layer of paper pulp to a rotating wire mesh 21 to initially form a paper sheet or web. The sheet is, of course, thereafter steamed, compressed and manipulated to form the final finished sheet material. A measure of the grinding or refining action of both the tickler and base refiners is termed freeness and this can be measured by a vacuum type gauge 22 located at mesh 21.

Referring now to control section 12 the output of the vacuum gauge 22 on line 23 is compared with a vacuum target 24 and the difference on line 26 is in effect an error signal. A vacuum error may be due either to a change of target or variations in the measured value of the vacuum. The error signal on line 26 is coupled to the block 27 labeled vacuum control algorithm which has an output a specific energy change command $\Delta E_T$ which is coupled both to the tickler refiner 18 and the network of base refiners $R_1$, $R_i$, $R_n$.

In the case of the tickler refiner, the $\Delta E_T$ specific energy change signal is processed by a feed forward predictor control unit 28 which has as its output on line 29 a $\Delta E$ tickler or specific energy change or loading of the tickler which is required. This is coupled to a tickler control algorithm unit 31 which effectuates the desired change in loading of tickler refiner 18 by means of tickler interface unit 32. Since the specific energy is related to both flow, F, in gallons per minute and consistency, C, which is a measure of the water content in the paper pulp flow, these values are coupled to the tickler control algorithm through the measurement lines 33 and 34. Interface unit 32 accomplishes the change of loading on line 36 of the closed loop control which is completed by the current sensing line 37 back to interface unit 32.

In general, the feed forward predictor control unit 28 operates on an algorithm which contains a model of the refining process. Based on this model, it will predict when the change in base refiners approaches the tickler and it will then force the tickler gradually back to its midrange with minimal or no disturbance of the vacuum reading on line 23. The result of this procedure is the tickler will always be ready for control of any upset including high frequency upsets either in the actual vacuum due to random variations or in the vacuum target.

The $\Delta E$ output of vacuum control algorithm 27 is also coupled to a distribution algorithm unit 38 which properly distributes the required change of specific energy to the various base refiners. In FIG. 1 only three refiners are illustrated in parallel; however, there can be a complex matrix of refiners as illustrated in FIG. 4. The output of the distribution algorithm control unit 38 is coupled to a current control algorithm unit 39 which is provided for each refiner and is interfaced with that particular refiner through an interface unit 41. The loading of these refiners is accomplished in the same manner as the tickler refiner. Also, the distribution algorithm unit 38 has as inputs the consistency, C, for the main flow line 16, the flow rate, F, for each refiner and the applied voltage, $\alpha$. In addition, there are participation factors for each refiner designated $P_{11}$, $P_{ij}$, $P_{nm}$. The overall distribution system will be discussed below.

To provide for manual control, a select switch 42 allows the specific energy change line, $\Delta E_T$ to be disconnected and the distribution output of unit 38 to be coupled to a specific energy target line 43.

FIG. 2 illustrates the transfer functions of the process of FIG. 1 where the feed forward predictor unit 28 has a Z function P(Z) and tickler refiner 18 has the function $G_2(s)$ where s, of course, is the Laplace operator. Hold blocks 44 and 46, designated H(s) indicate that the system is digital in nature or that there are discrete sampling intervals, T. Finally the base refiners $R_{1,n}$ and the machine chest 17 are indicated with the transfer function $G_1(s)$. The following equations (1), (2) and (3) illustrate these functions.

$$G_1(s) = \frac{k_1 e^{-L_1 s}}{Y_1 s + 1} \quad (1)$$

$$G_2(s) = \frac{k_2 e^{-L_2 s}}{Y_2 s + 1} \quad (2)$$

$$\text{HOLD} = H(s) = \frac{1 - e^{-Ts}}{s} \quad (3)$$

where $k_1$ is the vacuum/base refiner, $L_1$ is the base-vacuum transport delay, $Y_1$ is the base refiner-vacuum time constant, $k_2$ is the vacuum/tickler gain, $L_2$ the tickler-vacuum transport delay, and $Y_2$ the tickler-vacuum time constant. The overall process $G_T(s)$ is illustrated by equation (4).

$$G_T(s) = \frac{k_1 e^{-L_2 s}}{Y_1 s + 1} \quad (4)$$

As may now be apparent, the general problem in the control system as illustrated in FIG. 2 is that due to the machine chest which introduces long delays, only low frequency disturbances can normally be regulated. With the introduction of the tickler refiner, it is possible to control high frequency disturbances also. However, the tickler refiner has a limited operating range and, therefore, it is important to keep the tickler at an optimum or mid range operating state so as to achieve more effective control at all times. The feed forward predictor control unit 28 with its transfer function P(Z) adjusts the tickler refiner's specific energy so as to correct immediately for changes in vacuum. Once the base refiner's effect is apparent it backs the tickler to its mid range. Of course, as discussed in conjunction with FIG. 1, both the base refiners and tickler refiner when an upset in vacuum occurs are immediately shifted to correct such error. In other words, the $\Delta E_T$ error signal is supplied both to the base refiners and the tickler refiners. This is clearly illustrated in FIG. 2.

The design criteria for the feed forward controller is illustrated by the equation (5).

$$P(Z) * Z[H(s) * G_2(s)] + Z[H(s) * G_1(s)] = Z[H(s) * G_T(s)] \quad (5)$$

In words, equation (5) states that the combination of the transfer functions of the feed forward predictor, the tickler refiner and the base refiners and machine chest should equal the overall transfer function of the process with, of course, the sampling intervals being compensated for by the H(s) function. Substituting equations (1), (2) and (3) and (4) in equation (5) yields equation (6).

$$P(Z) = \frac{k_1}{k_2} \left[ \frac{1-(1-e^{-T/T_1})}{1-e^{-T/T_2}} * \frac{(1-e^{-T/T_2}Z^{-1})}{1-e^{-T/T_1}Z^{-1}} * Z^{-(N1-N2)} \right] \quad (6)$$

where: N1-N2 = Integer value of $(L_1-L_2)/T$ assuming that $L_1 > L_2$. T equals sampling period. Equation (6) can be simplified since in most applications the base refiners-vacuum time constant, $Y_1$, is at least five times the tickler refiner-vacuum time constant, $Y_2$. Thus, assuming $Y_2$ is equal to zero equation (6) becomes $$P(Z) = \frac{k_1}{k_2} \left[ 1 - \frac{(1-e^{-T/T_1})Z^{-(N1-N2)}}{(1-e^{-T/T_1}Z^{-1})} \right] \quad (7)$$

Converting the Z transform algorithm equation (7) into the function of the specific energy, $E_{tick}$, applied to the tickler and the total average specific energy, $E_T$ yields equation (8).

$$\begin{aligned} E_{tick}(n) &= e^{-T/T_1} E_{tick}(n-1) \\ &+ \frac{k_1}{k_2}[E_T(n) - e^{-T/T_1} E_T(n-1) \\ &- (1-e^{-T/T_1}) E_T(n-(N_1-N_2))] \end{aligned} \quad (8)$$

As disclosed in the above Brewster patent, specific energy may also be measured by sensing the temperature rise across a refiner rather than measuring current and flow. Thus in equation (8) $E_{tick}$ may be replaced by $DT_{tick}$ and $E_T$ by $DT_T$ where
$DT_{tick} = \Delta$ temperature rise across tickler refiner, and
$DT_T = $ average $\Delta$ temperature required.
The foregoing substitutions can be made throughout this description. From a computer standpoint, equation (8) may be modified to form equation (9).

$$\begin{aligned} \Delta E_{tick}(n) &= K_1 * \Delta E_{tick}(n-1) + K_2 \Delta E_{T(n)} \\ &- (K_1 * K_2) * \Delta E_{T(n-1)} - (K_5 * K_2) * \Delta E_{T(n-K)} \\ &+ (K_3 * K_5 * K_2) * \Delta E_{(n-K-1)} \end{aligned} \quad (9)$$

where
$K_1 = e^{-T/T_1}$
$K_2 = k_1/k_2$
$K_3 = O = e^{-T/T_2}$
$K_4 = (L_1 - L_2)/T$
$K_5 = 1 - e^{-T/T_1}$
$n = $ algorithm output sequence number.

Note that in equation (9) in practice the last term of the equation would not be used since $K_3$ is equal to zero since $Y_2$ equals zero. However, if this time is significant, then the last term would be utilized and derived from the more complete equation (6).

FIGS. 3A, 3B and 3C show the operation of the feed forward algorithm when as illustrated in FIG. 3A a step change in target is created at zero iminutes. Specifically, the target change in inches of vacuum is 3.8 inches to 4.0 inches. As illustrated in FIG. 3A, in two to three minutes the vacuum has been changed to the new target and variations are less than ±0.1 inches. FIGS. 3B and 3C illustrate respectively the application of $\Delta E_T$ to the base refiners and the tickler refiner. Initially from a time of approximately zero to 4 minutes both the base refiners and the tickler refiner are identically loaded to accommodate the step change in vacuum. The time constant of the application of $\Delta E_T$ is due to the vacuum control algorithm which will be discussed below. After the 4 minute period, the base refiners' specific energy in FIG. 3B remains nearly constant over the next 25 minute period, the small variations being due to measured vacuum variations. The lower curve of FIG. 3B designated "output response base refiners" is the effective response at the vacuum measurement point and indicates that in approximately 3½ to 4 minutes the effect of the change in loading of the base refiners begins to be felt. Thus, the transport lag between the base refiners and tickler is substantially 3½ minutes; and the time constant, in other words, the 63% point, is approximately five minutes. The curve of FIG. 3B is essentially the difference between the upper curve of FIG. 3B and FIG. 3C. Finally as shown in FIG. 3C, tickler's specific energy at its mid range was 4.0 kilowatt-second/dry gpm moved to 5.1 and then gradually, using the feed forward algorithm process model, returned at approximately the 28 minute point to its initial optimum or mid range value.

Referring now to the vacuum control algorithm unit 27, (FIG. 1) in general the overall system of base refiner control, tickler refiner control, and the feed forward predictor control appears to the vacuum control algorithm as the process with a gain equal to that of the base refiners-vacuum, a transport delay equal to that of the tickler-vacuum and a time constant equal to that of the tickler-vacuum. The vacuum control algorithm is a typical single loop, transport delay, λ tuned algorithm as illustrated in equation (10)

$$\Delta E_T = Q/(GL) [E_{(n)} - (1-L) * E_{n-1}] \quad (10)$$

where
$L = 1 - $ exponential $[-T/TC]$ $T$ = sample period
$TC$ = tickler to vacuum time constant
$Q = 1 - $ exponential $[-\text{LAMBDA} * T]$
LAMBDA = the reciprocal of closed loop time constant with control
$G$ = tickler to vacuum gain
$E_{(n)}$ = present vacuum error
$E_{(n-1)}$ = previous vacuum error.

Referring now again to FIG. 1, as was discussed above, a distribution algorithm unit 38 provides for distribution of any change of specific energy among the matrix of base refiners. In many paper mill situations, a series parallel arrangement or matrix of refiners is used as illustrated in FIG. 4. In general, each of the various parallel paths are designated, $i$, where $i$ varies between $l$ and $n$ and the numbers of refiners in series in each parallel path is designated by $j$ which varies between $l$ and $m$. Thus, a generalized refiner is given by the subscript $ij$. As further illustrated in FIG. 4, therefore, the following designations may be made.

$Fi$ = Flow through refiners $Rij$ ($j=l,m$) which are in series and have the same flow
$Pij$ = Participation factor for refiner $Rij$
$Eij$ = Specific energy of refiner $Rij$
$E_T$ = Average specific energy of all refining $$F_T = \text{Total flow} \sum_{i=1}^{n} Fi$$

The specific energy of the given refiner, $E_{ij}$ is given by $$E_{ij} = \frac{Pij}{P_T} * E_T \quad (11)$$

where $P_T$ represents an overall participation factor. Since the specific energy and arrangement of series refiners is additive, then $$E_T * F_T = \sum_{i=1}^{n} \left( Fi \sum_{j=1}^{m} Eij \right) \quad (12)$$

Combining equations (11) and (12) gives $$P_T = \frac{\sum_{i=1}^{n} \left( Fi \sum_{j=1}^{m} Pij \right)}{\sum_{i=1}^{n} Fi} \quad (13)$$

Substituting for $P_T$ of equation (13) in equation (11) gives the distribution algorithm $$Eij = \frac{Pij \sum_{i=1}^{n} Fi}{\sum_{i=1}^{n} \left( Fi \sum_{j=1}^{m} Pij \right)} E_T \quad (14)$$

As can be seen from equation (14) the major term by which $E_T$ is multiplied will remain constant as long as the relative flow through each refiner and its participation factor remains unchanged. As discussed above, $E_{ij}$ may be replaced by $DT_{ij}$ and $E_T$ by $DT_T$.

The specific energy required from a given refiner is then converted to the required target current $I_{ij}$ using $$I_{ij} = \left( \frac{Fi * C}{\alpha} \right) * E_{ij} \quad (15)$$

where $C$ is equal to the stock consistency through refiner $R_{ij}$ and $\alpha$ equals the line voltage (RMS voltage/1000). Specific control of refiner current is achieved by comparing the refiner currents' measured value, for example, referring to FIG. 1, the measured value of a current line returning to interface unit 41, to the target current algorithm $I_{ij}$ and then using typical LAMBDA tuned two term algorithm to complete the control action. Of course, as discussed above temperature measurements, T, may be used as a measure of specific energy.

In order to obtain the initial participation factor values the steps of FIG. 6 should be performed. Thus, $E_{ij}$, the specific energy of each refiner in actual operation or a nominal value is computed by the associated equation shown in the Figure. Thereafter, the total specific energy $E_T$ is computed as shown. Next, each base refiner participation factor, $P_{ij}$ is obtained by multiplying the specific energy for that refiner $E_{ij}$ by the total participation factor, $P_T$ and dividing by the total specific energy, $E_T$. Normally, $P_T$ is 1 but the algorithm does not necessarily require this unity relationship. Thus, the final participaton factors $P_{11} \ldots P_{ij} \ldots P_{nm}$ are computed and supplied to the distribution algorithm shown in FIG. 5. Once the system is in operation, the operator may at his option change any participation factor. When this is done the algorithm of FIG. 6 must again be computed.

for bumpless transfer it is preferable that the values of the participation factors be read out for the operator to be used at start up.

While the control process is being carried on to manufacture, for example, paper, if any of the base refiners exceeds its high or low currents, that is, saturates, then its participation factor in the distribution algorithm shown in FIG. 5 is temporarily set to zero. Once it returns to its operating range as a result of a $\Delta E_T$ change opposite in sign to the one that caused it to saturate then its old participation factor is used. If any base refiner is outside of its high or low current range and any participation factor is changed by the operator then to calculate the new, $E_{ij}$, the participation factor should not be set to zero.

An example of the application of the distribution algorithm of FIG. 5 is illustrated in FIG. 7 where two refiners $E_{11}$ and $E_{12}$ are in series in one parallel path which has three quarters of the flow and the other refiner $E_{21}$ is in a second parallel path by itself which has one fourth of the flow. The relative participation factors are indicated. From the calculation from the term illustrated in FIG. 5 and from equation (14)

$$\frac{\sum_{i=1}^{n}\left(Fi \sum_{j=1}^{m} Pij\right)}{} = \frac{3F/4 + F/4}{\frac{3F}{4}(\frac{1}{2}+\frac{1}{4})=\frac{F}{4}(\frac{1}{4})} = \frac{F}{10F/16} = \frac{16}{10} \quad (16)$$

Therefore:

$$E_{11} = \frac{16}{10} * \frac{1}{2} * E_T = \frac{8}{10} E_T$$

$$E_{12} = \frac{16}{10} * \frac{1}{4} * E_T = \frac{4}{10} E_T$$

$$E_{21} = \frac{16}{10} * \frac{1}{4} * E_T = \frac{4}{10} E_T$$

The above distribution algorithm may also be used to control a matrix of tickler refiners.

Moreover, the distribution algorithm is based upon specific energy for each refiner--and the control of energy is open loop; that is, the total energy required is initially specified by an operator who also selects participation percentages for each refiner as discussed in conjunction with FIG. 6. In contrast, the Brewster patent continuously measures total specific energy and uses this information in a feedback loop to control participation factors and loading of the base refiners.

The control concept of the present invention is in general applicable to many control situations involving other than the specific embodiment disclosed. In general, the concept relates to feedback control over a process variable (such as freeness) which, may be sensed by and which may be controlled by two manipulated variables. In the present invention the first and second manipulated variables would be the specific energy targets or the loading of the base refiners and the tickler refiner. The tickler refiner in general has a fast dynamic response which allows for high frequency or fast control of its loading; however it is restricted in control range. On the other hand the base refiners have a relatively large control range compared to the tickler refiner but a much longer response time. The response time is in part due to the inherent time constant of the base refiners themselves and the transport lag which is in part due to the machine chest connecting the base refiners to the tickler refiner. The present invention teaches how to effectively coordinate the two manipulated variables so that each one can be used to advantage guaranteeing both high frequency control and range control under all operating conditions. In other words, the high frequency control capability of the tickler refiner would be used to immediately correct any disturbance in the process and thereafter the tickler refiner can be returned to its midrange automatically and under computer control to provide a smooth transition to allow the control action of the base refiner to take effect. It is apparent that this control scheme may be applied to many other similar processes.

FIG. 8 is a self-explanatory flow chart based on FIG. 1 with common reference numerals indicating corresponding portions from which one skilled in the art could easily code a general purpose digital computer.

Thus, from the foregoing, the present invention has provided an improved method and apparatus for controlling pulp refiners and more specifically provided an integrated control system for both base and tickler refiners and a simple control method for a complex series-parallel matrix of base refiners.

We claim:

1. A control system for controlling the quality of the output stock of a group of pulp refiners which include a plurality of base refiners and tickler refiner means the output stock of the tickler refiner means being used to manufacture sheet material and where the coupling between the base refiners and the tickler refiner means includes a significant time delay said system comprising: first control means associated with said tickler refiner means and responsive to a first input control signal for loading said tickler refiner means in accordance with such signal; second control means associated with said base refiners and responsive to second input control signal means for loading said base refiners in accordance with such signal means; means for sensing the quality of the output stock from said tickler refiner means and comparing such quality to a target value to provide an error signal; means associated with said base refiners and responsive to said error signal for causing said second output control signal means to load said base refiners to fully compensate for said error signal; feedforward means responsive to said error signal for causing said first output control signal to change from an optimum operating value to initially load said tickler refiner means to fully compensate for said error signal and thereafter gradually change said loading back to said optimum value in accordance with said time delay.

2. A system as in claim 1 where said second control means includes means for determining the energy distribution of said plurality of base refiners and maintaining said distribution constant even while said second input control signal varies the loading of said base refiners.

3. A system as in claim 2 where said determining and maintaining means includes means for initially determining the participation factor of each of said base refiners, means for determining at every control interval the specific energy required from each of said refiners in accordance with said error signal and said participation factors, and means for adjusting the loading on said base refiners in accordance with any change in said specific energy.

4. A method for controlling the quality of the output stock of a group of pulp refiners which include a plurality of base refiners and tickler refiner means the output stock of the tickler refiner means being used to manufacture sheet material, and where the coupling between the base refiners and the tickler refiner means includes a significant time delay said method comprising the following steps: sensing the quality of the output stock from said tickler refiner means and comparing such quality to a target value to provide an error signal; adjusting the loading of said base refiners to fully compensate for said error signal; concurrently with said base refiner adjustment, adjusting the loading of said tickler refiner means to fully compensate for said error signal and thereafter gradually returning the loading of said tickler refiner means to its original value in accordance with said time delay.

5. A control system for controlling a predetermined process variable said system having first and second manipulated variables upon which said process variable is dependent with disparate response times comprising: first processing means for manipulating said fisrt variable said processing means having relatively fast dynamic response for allowing high frequency control of said variable but being restricted in control range; second processing means for manipulating said second variable said processing means having a large control range relative to said first processing means but a much longer response time relative to said fast dynamic response, said first processing means being series coupled to the output of said second processing means; means for sensing said process variable at the output of said first processing means and comparing said sensed process variable to a target value to provide an error signal, means responsive to said error signal for causing said second processing means to manipulate said second variable to fully compensate for said error signal; feedforward means responsive to said error signal for causing said first processing means to change said first manipulated variable from an optimum operating value to a value which fully compensates for said error signal and thereafter which gradually changes said value back to said optimum value in accordance with said response time of said second processing means.

6. A system as in claim 5 where said control system is for pulp, said process variable is freeness, said second processing means includes a plurality of base refiners, said first processing means includes tickler refiner means, said first and second manipulated variables are the specific energy targets of said tickler refiner means and said base refiners respectively, and where said response time includes both transport lag and time constants.

* * * * *